United States Patent [19]

Terunuma et al.

[11] Patent Number: 5,473,492
[45] Date of Patent: Dec. 5, 1995

[54] MAGNETIC HEAD INCLUDING A REPRODUCING HEAD UTILIZING A MAGNETORESISTANCE EFFECT AND HAVING A MAGNETIC SHIELDING FILM CONTAINING NITROGEN

[75] Inventors: Kouichi Terunuma; Hiroaki Kawashima, both of Chiba, Japan

[73] Assignee: TDK Corporation, Tokyo, Japan

[21] Appl. No.: 203,315

[22] Filed: Mar. 1, 1994

[30] Foreign Application Priority Data

Mar. 3, 1993 [JP] Japan .................. 5-067487

[51] Int. Cl.⁶ .................. G11B 5/11; G11B 5/39
[52] U.S. Cl. .................. 360/128; 360/113
[58] Field of Search .................. 360/128, 113, 360/126, 121

[56] References Cited

U.S. PATENT DOCUMENTS

| | | | |
|---|---|---|---|
| 3,908,194 | 9/1975 | Romankiw | 360/113 |
| 3,975,772 | 8/1976 | Lin | 360/113 |
| 3,999,216 | 12/1976 | Berchtold | 360/125 |
| 4,683,012 | 7/1987 | Yamauchi et al. | 148/301 |
| 4,836,865 | 6/1989 | Sakakima et al. | 148/306 |
| 4,918,554 | 4/1990 | Bajorek et al. | 360/113 |
| 5,028,280 | 7/1991 | Ihara et al. | 148/306 |
| 5,084,795 | 1/1992 | Sakakima et al. | 360/120 |
| 5,117,321 | 5/1992 | Nakanishi et al. | 360/120 |
| 5,208,715 | 5/1993 | Mowry | 360/113 |
| 5,262,915 | 11/1993 | Terunuma et al. | 360/120 |
| 5,264,981 | 11/1993 | Campbell et al. | 360/126 |
| 5,287,237 | 2/1994 | Kitada et al. | 360/113 |

FOREIGN PATENT DOCUMENTS

| | | |
|---|---|---|
| 59-36319 | 2/1984 | Japan . |
| 59-52425 | 3/1984 | Japan . |
| 59-90222 | 5/1984 | Japan . |
| 59-98318 | 6/1984 | Japan . |
| 60-239911 | 11/1985 | Japan . |
| 61-258323 | 11/1986 | Japan . |
| 1-125712 | 5/1989 | Japan . |
| 01-149941 | 6/1989 | Japan . |
| 03-263306 | 11/1991 | Japan . |
| 4-73209 | 11/1992 | Japan . |

*Primary Examiner*—John H. Wolff
*Assistant Examiner*—Craig A. Renner
*Attorney, Agent, or Firm*—Oblon, Spivak, McClelland, Maier & Neustadt

[57] ABSTRACT

A magnetic head includes a reproducing head comprising a leading magnetic shield film, an insulator, a magnetoresistance film, an insulator, and a trailing magnetic shield film formed on a substrate from the substrate to a trailing direction. The leading magnetic shield film is made of a soft magnetic thin film having an atomic ratio composition of the formula: $T_{(100-x-y)}M_xN_y$ wherein T is Fe, Co, Ni or a mixture thereof, M is B, Al, Si, Ti, V, Cr, Y, Zr, Nb, Mo, Ru, Hf, Ta, W or a mixture thereof, N is nitrogen, $0.1 \leq x \leq 25$ and $0.1 \leq y \leq 25$ or a soft magnetic thin film consisting essentially of 60 to 80 at % of Fe, 5 to 15 at % of Al, 10 to 25 at % of Si, and 0.1 to 20 at % of N. The magnetic head having such a shielded MR head is more durable and increased in productivity and yield.

5 Claims, 2 Drawing Sheets

MAGNETIC HEAD INCLUDING A REPRODUCING HEAD UTILIZING A MAGNETORESISTANCE EFFECT AND HAVING A MAGNETIC SHIELDING FILM CONTAINING NITROGEN

BACKGROUND OF THE INVENTION

This invention relates to a magnetic head including a reproducing head utilizing magnetoresistance effect.

Great research efforts have been made to increase the sensitivity of magnetic sensors and to increase the density of magnetic recording. One approach tends toward utilization of magnetoresistance effect wherein it is attempted to develop magnetic sensors and heads of the magnetoresistance type which are abbreviated as MR sensors and heads, respectively. Both MR sensors and heads include a reading sensor section made of a magnetic material whereby external magnetic signals are read out as resistance changes of the sensor section. The MR heads are characterized in that their reproduction outputs do not depend on the relative speed thereof to recording media and thus ensure high outputs in magnetic recording at a high linear recording density. For providing increased resolution capability and satisfactory high-frequency response, the MR heads generally include a magnetoresistance film interposed between a pair of magnetic shield components, such MR heads being known as shielded MR heads.

Japanese Patent Application Kokai (JP-A) No. 116009/1990 discloses a shielded magnetoresistance sensor which is a modification of the shielded MR head. This sensor is applicable to rigid magnetic disk storage systems or hard disk devices. In the hard disk devices, the magnetic head has an MR head exposed at the pneumatic bearing surface of a slider, permitting the MR head to be damaged by contact with the disk. More particularly, when magnetic shield films are made of a NiFe alloy or Permalloy, the shield film on the leading side (or leading shield) can be stretched by contact with the disk to form a short-circuit conductive path with the magneto-resistance film, resulting in a loss of sensor function. JP-A 116009/1990 prevents such short-circuit by using a less stretchable FeSiAl alloy or Sendust as the leading shield film.

However, Sendust film as deposited, for example, by sputtering has less desirable soft magnetic properties as compared with Permalloy. It must be annealed at temperatures above 400° C. before shield properties equivalent to those of Permalloy can be exerted. Since the leading magnetic shield film is generally formed on a non-magnetic substrate or insulating film which are made of ceramic materials having substantially different coefficients of thermal expansion from Sendust, there is a likelihood for the Sendust film or insulating film to strip off upon annealing. This results in a reduced manufacturing yield.

Use of amorphous alloys as the MR head magnetic shield film is proposed in JP-B 73209/1992 and JP-A 036319/1984, 052425/1984, 090222/1984, 098318/1984, 239911/1985, and 125712/1989. However, MR heads of this type suffer from a lowering of magnetic shield performance because the amorphous alloy is degraded by heat generated by continuous current flow through the magnetoresistance film as disclosed in JP-A 258323/1986. Then JP-A 258323/1986 uses alternating films of an amorphous high permeability soft magnetic material and a crystalline high permeability soft magnetic material as the magnetic shield, which still experiences a 20% loss of magnetic permeability after 1,000 hours. Amorphous film must be heat treated at temperatures above 300° C. in order to provide satisfactory soft magnetism as disclosed in JP-A 090222/1984 and 098318/1984 while such heat treatment detracts from productivity.

SUMMARY OF THE INVENTION

Therefore, an object of the present invention is provide a magnetic head including a shielded MR head which has improved durability, efficient production and high manufacturing yields.

The present invention is concerned with a magnetic head including a reproducing head. The reproducing head includes a leading magnetic shield film, an insulator, a magnetoresistance film, an insulator, and a trailing magnetic shield film formed on a substrate from the substrate to a trailing direction. According to a first aspect of the present invention, the leading magnetic shield film is made of a soft magnetic thin film having a composition of the formula:

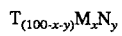

wherein T is at least one element selected from the group consisting of Fe, Co, and Ni; M is at least one element selected from the group consisting of B, Al, Si, Ti, V, Cr, Y, Zr, Nb, Mo, Ru, Hf, Ta, and W; N is nitrogen; letters x and y representative of the atomic percents of M and N are in the range: $0.1 \leq x \leq 25$ and $0.1 \leq y \leq 25$.

According to a second aspect of the present invention, the leading magnetic shield film is made of a soft magnetic thin film consisting essentially of 60 to 80 atom % of iron, 5 to 15 atom % of aluminum, 10 to 25 atom % of silicon, and 0.1 to 20 atom % of nitrogen.

In one preferred embodiment, the trailing magnetic shield film is also made of a soft magnetic thin film of the composition defined herein.

Preferably the magnetic head further includes a recording head. The recording head is on the trailing side of the trailing magnetic shield film. The trailing magnetic shield film is utilized as a leading core of the recording head.

The magnetic head of the present invention includes a magnetic shield film which is fully durable because it is as low malleable or stretchable as Sendust films and amorphous films and thus unsusceptible to short-circuiting by contact or collision with the magnetic recording medium. The magnetic shield film according to the invention eliminates a need for heat treatment at high temperature, which is required in the Sendust fills and amorphous fills, and exhibits magnetic shield properties at least equal to those of the heat treated Sendust films and amorphous films. The invention thus avoids film stripping resulting from thermal expansion mismatch and allows more effective production due to elimination of heat treatment. Since it is unnecessary to pay attention to damage to the magnetoresistance film by heat treatment, the invention can also be applicable to the trailing side magnetic shield film, resulting in further improved magnetic shield properties.

The magnetic shield film according to the present invention is highly reliable because it is fully heat resistant as opposed to the amorphous magnetic shield film so that it may experience little loss of soft magnetic properties even when continuously heated for a long time by heat release of the magnetoresistance film. The magnetic shield film is also minimized in deterioration by temperature rises associated with resist baking during head preparation, temperature rises associated with formation and heat treatment of other films or the like.

Additionally the magnetic shield film according to the present invention is fully resistant against corrosion as compared with conventional Pennalloy and Sendust films.

DETAILED DESCRIPTION OF THE INVENTION

Figure 1:
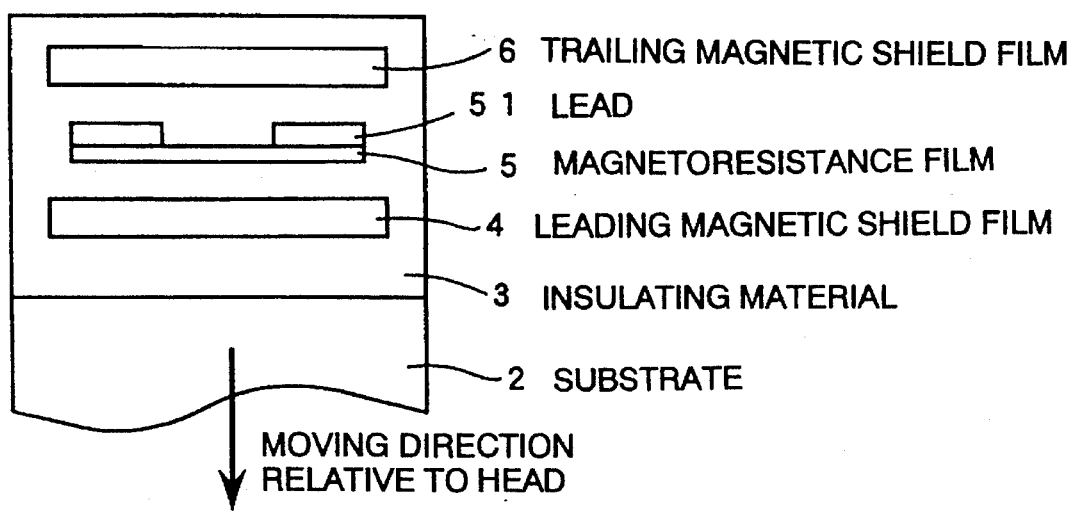
FIG. 1 is a plan view of a magnetic head according to one embodiment of the invention as viewed from the medium side.

According to the present invention, the magnetic shield film is made of a soft magnetic thin film having an atomic ratio composition of the following formula.

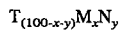

$T_{(100-x-y)}M_xN_y$

In the formula, T is at least one transition metal element selected from the group consisting of iron (Fe), cobalt (Co), and nickel (Ni), M is at least one element selected from the group consisting of boron (B), aluminum (Al), silicon (Si), titanium (Ti), vanadium (V), chromium (Cr), yttrium (Y), zirconium (Zr), niobium (Nb), molybdenum (Mo), ruthenium (Ru), hafnium (Hf), tantalum (Ta), and tungsten (W), N is nitrogen, letters x and y are in the range:

$0.1 \leq x \leq 25$, preferably $0.5 \leq x \leq 20$ and $0.1 \leq y \leq 25$, preferably $0.5 \leq x \leq 20$.

Where T is a mixture of two or more elements selected from the group consisting of Fe, Co, and Ni, any suitable proportion of the elements is satisfactory.

Where T contains iron as a major component, M is preferably Zr alone or V alone, especially Zr alone or consists of at least 20% of Zr and/or V and other elements selected from the above group (excluding Zr and V) because enhanced (100) plane orientation is expectable. In this case, x and y are preferably in the range: $6.5 \leq x \leq 20$ and $6.5 \leq y \leq 20$. In an example wherein M is zirconium, zirconium nitride becomes an inhibitor against the growth of Fe crystals so that (100) orientation may preferentially take place. In this example, it is necessary that the film as deposited has a y/x ratio of approximately unity. Thermal stability is also improved because formation of ZrN suppresses growth of Fe crystal grains.

With respect to the range of x representing the atomic percent of M, no (100) plane orientation is obtained with x below the above-defined range whereas saturation magnetic flux density Bs lowers with x exceeding the above-defined range. With x outside the above-defined range, the film has low hardness, increased stretch and increased magnetostriction. Inside the above-defined range, (100) orientation or its degree is enhanced and soft magnetic properties are significantly improved.

With respect to the range of y representing the atomic percent of nitrogen, if y is below the above-defined range, there is a likelihood that little soft magnetic properties are available due to insufficient refinement of crystal grains by nitrogen. With y exceeding the above-defined range, more than required nitrides of T and M are formed so that little soft magnetic properties are obtained. Satisfactory (100) plane orientation is achieved with y inside the above-defined range. If desired, oxygen may be contained in an amount of up to 5 atom % of the entire composition in addition to nitrogen.

The y/x ratio preferably has a lower limit of 0.6, more preferably 0.65, further preferably 0.7, most preferably 0.8. The y/x ratio also preferably has an upper limit of 2.0, more preferably 1.8, further preferably 1.5, most preferably 1.2. Limiting y/x within this range allows easy formation of (100) oriented films.

The composition of a soft magnetic thin film as deposited may be determined by electron probe microanalysis (EPMA), for example.

Soft magnetic thin films of the above-defined composition may be formed by any suitable one of gas phase deposition methods including evaporation, sputtering, ion plating and chemical vapor deposition (CVD). Preferred among others is film deposition by sputtering. For example, a cast or sintered alloy piece is used as the target while multiple targets may also be used. Sputtering is then effected in an inert gas atmosphere such as argon. Where it is desired to effect reactive sputtering, the target used may be of substantially the same composition as the above-defined formula except that N is omitted. Sputtering is then effected in an atmosphere containing 0.1 to 15% by volume, preferably 2 to 10% by volume of nitrogen gas in argon. Outside this range, it is difficult to provide soft magnetic properties.

The sputtering mode is not critical and the sputtering apparatus used is not limited and may be a conventional one. The operating pressure is usually about 0.1 Pa to about 1.0 Pa. Sputtering conditions including input voltage and current may be suitably determined in accordance with a particular sputtering mode. For enhancing (100) orientation, magnetron sputtering is preferred wherein a leakage magnetic field of about 100 to 500 Oe prevails around the target. The magnetron sputtering may be by either RF or DC mode.

The film itself has (100) orientation as deposited. Since (200) plane is oriented parallel to the film surface or substrate surface, a broad Fe (200) peak appears in an X-ray diffraction chart. A film having enhanced (100) orientation is formed whether it is deposited on substrates of magnetic materials such as ferrite, non-magnetic ceramics, or polymer films. In an X-ray diffraction chart where CuKα is used, the Fe (200) peak has a 2θ of about 65° wherein θ is a diffraction angle.

It is to be noted that stresses can be generated in the stacking laminate because the magnetic shield film-forming temperature is generally different from the insulating film-forming temperature. If desired, such stresses may be relieved by effecting heat treatment on the laminate after the necessary films have been deposited. Preferred heat treatment conditions include a heating rate of about 2° to 8° C./min., a holding temperature of about 200° to 350° C., a holding time of about ½ to 2 hours, and a cooling rate of about 2° to 8° C./min. Heat treatment is preferably effected in vacuum or in an inert gas atmosphere such as argon.

The soft magnetic thin film of the above-defined composition generally has a mean crystal grain size of about 50 to about 500 Å, preferably about 100 to about 300 Å, especially about 150 to about 250 Å. The mean grain size (D) is determined by measuring the half-value width $W_{50}$ of a Fe (200) peak in an X-ray diffraction chart and calculating according to the following Scherrer's equation:

$$D = 0.9\lambda / W_{50} \cos\theta$$

wherein $\lambda$ is the wavelength of X-ray used and $\theta$ is a diffraction angle. As noted above, the Fe (200) peak has a $2\theta$ of about 65° where CuK$\alpha$ is used.

The soft magnetic thin film of the above-defined composition generally has a micro-Vickers hardness of at least 700, which can be increased up to 1,100 or higher, especially up to 1,150 to 1,500 by heat treatment. The micro-Vickers hardness is as defined in JIS.

In the second aspect of the present invention, the leading magnetic shield film is made of a soft magnetic thin film consisting essentially of 60 to 80 at %, preferably 63 to 70 at % of Fe, 5 to 15 at %, preferably 6 to 10 at % of Al, 10 to 25 at %, preferably 8 to 15 at % of Si, and 0.1 to 20 at %, preferably 5 to 20 at % of N.

If at least one of iron, aluminum, and silicon in this composition is outside the above-defined range, a film loses satisfactory soft magnetic properties and is less effective as the magnetic shield film. If nitrogen is below the above-defined range, grain refinement becomes short so that a film has no satisfactory soft magnetic properties as deposited. If nitrogen exceeds the above-defined range, more than required nitrides of iron, aluminum, and silicon are formed so that no satisfactory soft magnetic properties are obtained.

The film of this composition generally has a micro-Vickers hardness of at least about 700, especially about 800 to about 1,500 and a mean grain size of about 50 to about 200 Å.

The soft magnetic thin film of the composition according to the second aspect may be formed by substantially the same methods as the soft magnetic thin film of the T-M-N system composition. Heat treatment as previously mentioned may be effected if desired.

Now the configuration of the magnetic head according to the invention is described.

Referring to FIG. 1, there is illustrated a reproducing head which is one exemplary magnetic head according to the invention. The head is used in combination with a magnetic recording medium which is moved relative to the head. FIG. 1 is a plan view of the head as viewed from the medium side wherein the direction of relative movement of the head to the medium is downward in the figure as shown by an arrow. The head thus has a leading side at the bottom and a trailing side at the top in the figure. The reproducing head in FIG. 1 includes a leading magnetic shield film 4, a magnetoresistance film 5 having a pair of leads 51 connected thereto, and a trailing magnetic shield film 6 formed on a substrate 2 from the substrate to the trailing direction, with an insulating material 3 intervening between these components.

In the reproducing head of this configuration, the leading magnetic shield film 4 at its exposed surface receives a force to stretch the film toward the trailing side when the medium contacts or collides with the surface of the head facing the medium. Under such situation, at least the leading magnetic shield film 4 is made of a soft magnetic thin film of the composition defined herein according to the present invention.

Figure 2:
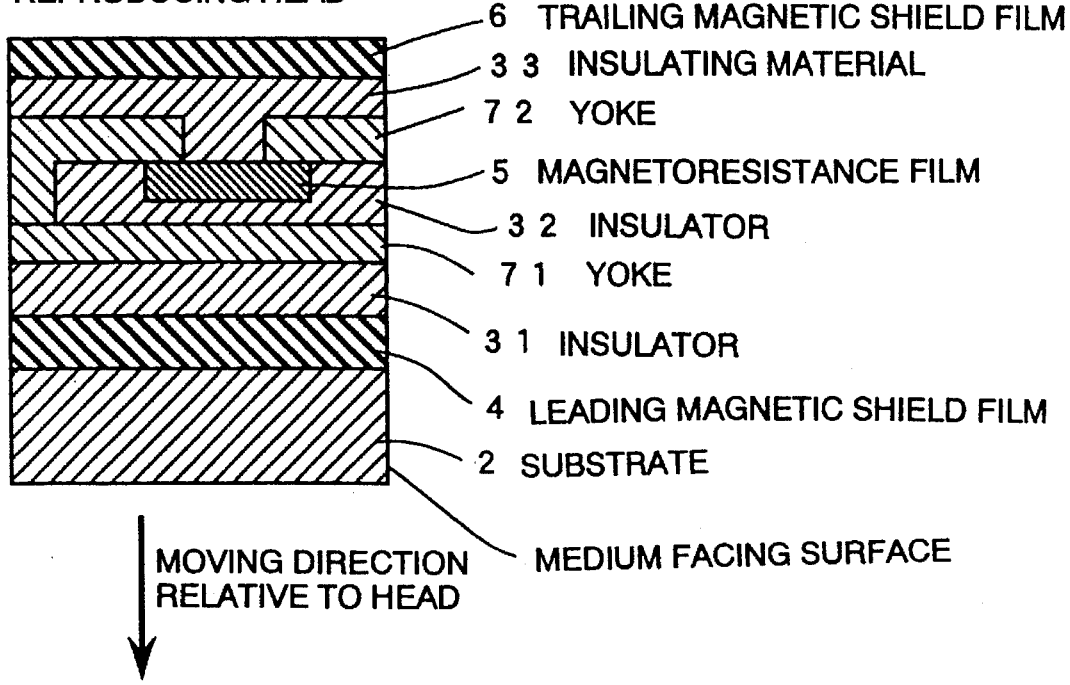
FIG. 2 is a cross-sectional view of a magnetic head according to another embodiment of the invention.

It is understood that the reproducing head shown in FIG. 1 is a conventional shielded MR head design wherein the magneto-resistance film 5 is exposed at the medium facing surface while the present invention is also applicable to a yoked MR head as shown in FIG. 2. The reproducing head shown in FIG. 2 includes a leading magnetic shield film 4, an insulator 31, a yoke 71, an insulator 32, a magnetoresistance film 5, a yoke 72, an insulator 33, and a trailing magnetic shield film 6 formed on a substrate 2 from the substrate to the trailing direction. This reproducing head has a medium facing surface at the right-hand side in the figure, with the magnetic flux extending through the yoke 71, magnetoresistance film 5 and yoke 72. The head of this configuration is effective for protecting the magneto-resistance film 5 from contact or collision with the medium because the magnetoresistance film 5 is not exposed at the medium facing surface. It is preferred that in addition to the magnetic shield films, the yokes 71 and 72 be made of soft magnetic thin film of the composition defined herein which is fully durable and resistant against contact and collision with the medium.

The present invention is also applicable to a combination head having both recording and reproducing heads.

Figure 3:
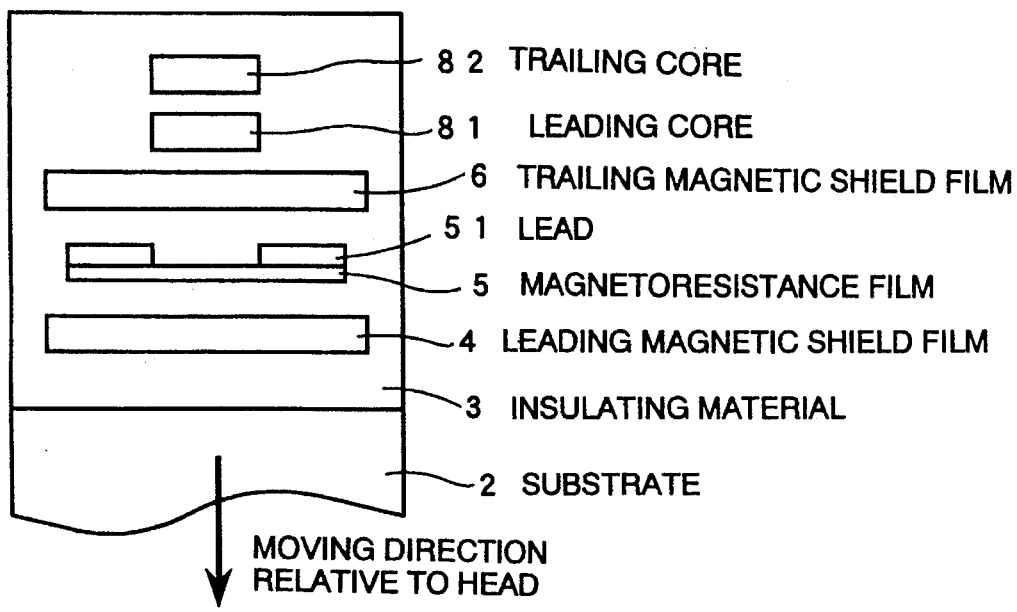
FIG. 3 is a plan view of a magnetic head according to a further embodiment of the invention as viewed from the medium side.

FIG. 3 shows a recording/reproducing head which has a recording head on the trailing side of the reproducing head shown in FIG. 1 via an insulator. The recording head is a conventional thin film head including leading and trailing cores 81 and 82.

Figure 4:
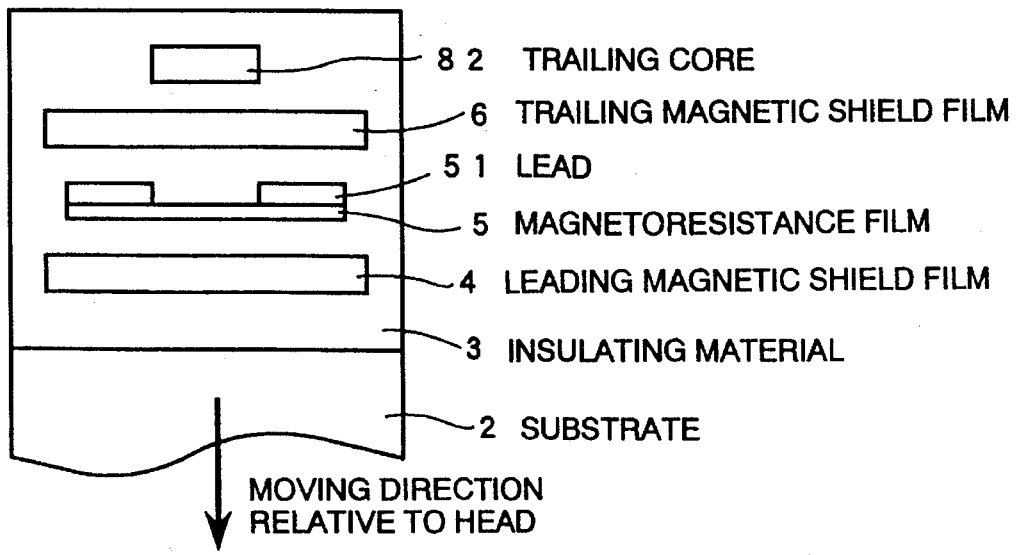
FIG. 4 is a plan view of a magnetic head according to a still further embodiment of the invention as viewed from the medium side.

FIG. 4 shows another recording/reproducing head including a recording head which utilizes the trailing magnetic shield film 6 of the reproducing head shown in FIG. 1 as a leading core. The recording head further includes a trailing core 82 formed on the trailing side of the trailing magnetic shield film 6.

In the magnetic head of the present invention, the components other than the magnetic shield film(s) are not critical and may be substantially the same as in conventional MR heads and combined MR heads.

For example, the magnetoresistance film may be made of Permalloy, Ni—Co alloys and other various materials having magnetoresistance effect. Leads to the magnetoresistance film are preferably made of materials which do not diffuse into the magnetoresistance film, for example, tantalum and tungsten. The insulator may be conventional insulating materials including ceramics such as $Al_2O_3$ and $SiO_2$. Although the trailing magnetic shield film and the cores of the recording head are preferably made of soft magnetic thin film of the composition defined herein, various other soft magnetic materials such as Permalloy may be used for these components. The substrate which is often made of ceramic materials is fixedly joined to a slider of the magnetic head or forms a slider by itself.

Also the dimensions of the head components are not critical and may be suitably determined in accordance with the construction of the magnetic recording medium to be operated therewith. In general, the magnetic shield film has a thickness of about 1 to 5 µm and a width of about 30 to 200 µm, the magnetoresistance film has a thickness of about 100 to 600 Å and a width of about 2 to 10 µm, and the magnetic shield film is spaced about 0.1 to 1.0 µm from the magnetoresistance film. The cores of the recording head have a thickness of about 1 to 5 µm and a width of about 2 to 10 µm and the trailing magnetic shield film is spaced about 0.5 to 5 µm from the recording head core.

In the magnetic head of the invention, the mode of linear operation of the magnetoresistance film is not critical and may be suitably selected from known techniques including current biasing, hard film biasing, soft fill biasing, and shape biasing techniques.

The magnetic head of the invention is generally fabricated by steps of thin film deposition and patterning. For thin fill formation, any of gas phase deposition techniques such as sputtering and vacuum evaporation and plating techniques may be used. For patterning, selective etching and selective deposition are useful.

On use, the magnetic head of the invention is combined with an arm and other components into a conventional well-known assembly.

EXAMPLE

Examples of the present invention are given below by way of illustration and not by way of limitation.

A magnetic head of the configuration shown in FIG. 3 was fabricated.

On a substrate 2 of $Al_2O_3$—TiC, there were sequentially deposited (1) a layer of insulating material $Al_2O_3$ having a thickness of 10 µm, (2) a leading magnetic shield film 4 of the composition shown in Table 1 having a thickness of 3 µm, (3) a layer of insulating material $Al_2O_3$ having a thickness of 0.5 µm, (4) a magnetoresistance film 5 of Permalloy having a thickness of 300 Å and a width of 3.5 µm, (5) lead segments 51 of tantalum having a thickness of 0.2 µm, (6) a layer of insulating material $Al_2O_3$ having a thickness of 0.5 µm, (7) a trailing magnetic shield film 6 of the composition shown in Table 1 having a thickness of 3 µm, and (8) a layer of insulating material $Al_2O_3$ having a thickness of 3 µm in the described order, all by sputtering. Patterns were formed by ion milling.

Then a leading core 81 of Permalloy having a thickness of 3 µm was formed by liquid phase plating. Insulating material $Al_2O_3$ having a thickness of 0.3 µm was deposited by sputtering to define a gap. A trailing core 82 of Permalloy having a thickness of 3 µm was formed by liquid phase plating. Finally, insulating material $Al_2O_3$ was deposited to a thickness of 50 µm to form a protective film. Thereafter, the substrate was fixedly joined to a slider and assembled in a hard disk drive.

The composition of the magnetic shield films are shown in Table 1. Note that following deposition, the Sendust (FeAlSi) film of magnetic head No. 2 was heat treated in vacuum at 450° C. for 2 hours. The amorphous CoMoZr film of magnetic head No. 3 after deposition was heat treated in vacuum at 400° C. for 2 hours with a rotary magnetic field of 300 Oe applied thereto.

For examining durability, the magnetic heads were subject to a contact-start-and-stop (CSS) test to measure the initial output and the output after the CSS test. At the end of $5\times10^4$ CSS cycles, the medium facing surface of the magnetic shield film was observed for plastic flow under a scanning electron microscope. Also for examining shield effect, the half-value width of a solitary reproduction waveform was measured.

The results are shown in Table 1. It is to be noted that the output after the CSS test is expressed as a relative value based on an initial output of 100%. Plastic flow was labeled "X" where stretching of the shield film toward the trailing side was noticed and "O" when no stretching was noticed.

TABLE 1

| Magnetic head No. | Magnetic shield film composition (atom %) | | Initial output (µVp-p) | Half-value width (nsec) |
|---|---|---|---|---|
| | Leading | Trailing | | |
| 1* | $Ni_{81}Fe_{19}$ | $Ni_{81}Fe_{19}$ | 750 | 72.5 |
| 2* | $Fe_{74}Al_9Si_{17}$ | $Ni_{81}Fe_{19}$ | 740 | 74.7 |
| 3* | $Co_{80.0}Mo_{9.5}Zr_{10.5}$ | $Ni_{81}Fe_{19}$ | 800 | 69.1 |
| 4* | $Fe_{96}N_4$ | $Ni_{81}Fe_{19}$ | 760 | 71.3 |
| 5 | $Fe_{84}Zr_8N_8$ | $Ni_{81}Fe_{19}$ | 820 | 67.0 |
| 6 | $Ni_{80}Fe_{18}Zr_{1.0}N_{1.0}$ | $Ni_{81}Fe_{19}$ | 815 | 67.2 |
| 7 | $Fe_{84}Zr_8N_8$ | $Fe_{84}Zr_8N_8$ | 850 | 60.4 |
| 8 | $Ni_{80}Fe_{18}Zr_{1.0}N_{1.0}$ | $Ni_{80}Fe_{18}Zr_{1.0}N_{1.0}$ | 850 | 60.6 |
| 9 | $Fe_{67}Al_9Si_{14}N_{10}$ | $Ni_{81}Fe_{19}$ | 760 | 69.2 |
| 10 | $Fe_{67}Al_9Si_{14}N_{10}$ | $Fe_{67}Al_9Si_{14}N_{10}$ | 810 | 65.3 |

| Magnetic head No. | Relative output (%) after CSS cycles | | | | | Plastic flow of shield film | |
|---|---|---|---|---|---|---|---|
| | Initial | $2 \times 10^3$ | $5 \times 10^4$ | $1 \times 10^4$ | $2 \times 10^4$ | $5 \times 10^4$ | Leading | Trailing |
| 1* | 100 | 70 | 30 | 10 | 5 | 0 | X | X |
| 2* | 100 | 98 | 98 | 97 | 95 | 90 | O | X |
| 3* | 100 | 99 | 98 | 97 | 97 | 95 | O | X |
| 4* | 100 | 99 | 97 | 95 | 94 | 92 | O | X |
| 5 | 100 | 99 | 99 | 98 | 97 | 96 | O | X |
| 6 | 100 | 98 | 98 | 97 | 97 | 95 | O | X |
| 7 | 100 | 100 | 99 | 98 | 97 | 97 | O | O |
| 8 | 100 | 100 | 99 | 98 | 97 | 97 | O | O |
| 9 | 100 | 98 | 98 | 97 | 96 | 92 | O | X |
| 10 | 100 | 99 | 98 | 97 | 97 | 96 | O | O |

*outside the scope of the invention

As is evident from Table 1, the magnetic heads of the present invention are effective. More particularly, magnetic head Nos. 5 to 10 within the scope of the invention produced equal or greater outputs and equal or lower half-value widths as compared with magnetic head Nos. 1 to 4 using Permalloy, Sendust and amorphous CoMoZr as the leading magnetic shield film, respectively, indicating that the inventive magnetic shield film provided satisfactory magnetic shield effect. The magnetic shield films in the inventive magnetic heads were at least equally durable in the CSS test as compared with the Sendust and amorphous films. Especially magnetic head Nos. 7, 8 and 10 which additionally used the soft magnetic thin film of the composition defined herein as the trailing magnetic shield film exhibited significantly improved magnetic shield effect and very high durability in the CSS test.

Similar results were obtained when magnetic heads of the configuration shown in FIG. 1, 2 or 4 were fabricated by substantially the same procedure as above.

Although some preferred embodiments have been described, many modifications and variations may be made thereto in the light of the above teachings. It is therefore to be understood that within the scope of the appended claims, the invention may be practiced otherwise than as specifically described.

We claim:

1. A magnetic head comprising a reproducing head comprising:

i) a leading magnetic shield film;

ii) a first insulator, in secure contact with said leading magnetic shield film;

iii) a magnetoresistance film, in secure contact with said first insulator;

iv) a second insulator, in secure contact with said magnetoresistance film; and, v) a trailing magnetic shield film, in secure contact with said second insulator, formed on a substrate, wherein said leading magnetic shield film, said first insulator, said magnetoresistance film, said second insulator and said trailing magnetic shield film, together are formed on said substrate from the substrate to a trailing direction, wherein said leading magnetic shield film is made of a soft magnetic thin film having an atomic ratio composition of the formula:

$$T_{(100-x-y)}M_xN_y$$

wherein

T is at least one element selected from the group consisting of Fe, Co and Ni,

M is at least one element selected from the group consisting of B, Al, Si, Ti, V, Cr, Y, Zr, Nb, Mo, Ru, Hf, Ta and W, N is nitrogen, letters x and y are in the range: $0.1 \leq x \leq 25$ and $0.1 \leq y \leq 25$; and wherein said magnetic head exhibits an improved magnetic shield effect such as, increased output and decreased half-value widths.

2. A magnetic head comprising a reproducing head comprising:

i) a leading magnetic shield film;

ii) a first insulator, in secure contact with said leading magnetic shield film;

iii) a magnetoresistance film, in secure contact with said first insulator;

iv) a second insulator, in secure contact with said magnetoresistance film; and, v) a trailing magnetic shield film, in secure contact with said second insulator, formed on a substrate, wherein said leading magnetic shield film, said first insulator, said magnetoresistance film, said second insulator and said trailing magnetic shield film, together are formed on said substrate from the substrate to a trailing direction, wherein said leading magnetic shield film is made of a soft magnetic thin film consisting essentially of:

60 to 80 atom percent of Fe, 5 to 15 atom percent of Al, 10 to 20 atom percent of Si, and 0.1 to 20 atom percent of N; and wherein said magnetic head exhibits an improved magnetic shield effect such as increased output and decreased half-value widths.

3. A magnetic head according to claim 1 or 2 wherein said trailing magnetic shield film is made of the soft magnetic thin film.

4. A magnetic head according to claim 1 or 2 which further includes a recording head which utilizes said trailing magnetic shield film as a leading core.

5. A magnetic head according to claim 1 or 2 which further includes a recording head on the trailing side of said trailing magnetic shield film.

\* \* \* \* \*